April 22, 1924.

W. B. WESCOTT

INTERMITTENT TRANSMISSION APPARATUS

Original Filed Dec. 30, 1916

1,491,367

Inventor:
William B. Wescott,
by Roberts Roberts & Cushman
Attys.

Patented Apr. 22, 1924.

1,491,367

UNITED STATES PATENT OFFICE.

WILLIAM B. WESCOTT, OF WELLESLEY, MASSACHUSETTS, ASSIGNOR TO KALMUS, COMSTOCK & WESCOTT, INCORPORATED, OF BOSTON, MASSACHUSETTS, A CORPORATION OF MASSACHUSETTS.

INTERMITTENT TRANSMISSION APPARATUS.

Application filed December 30, 1916, Serial No. 139,762. Renewed October 6, 1923.

*To all whom it may concern:*

Be it known that I, WILLIAM B. WESCOTT, a citizen of the United States, and resident of Wellesley, in the county of Norfolk and State of Massachusetts, have invented new and useful Improvements in Intermittent Transmission Apparatus, of which the following is a specification.

This invention relates to intermittent transmission apparatus of the pin and star wheel type and more particularly to a Geneva movement having a plurality of Geneva wheels cooperating with a single pin wheel.

In multiplex motion picture apparatus wherein a plurality of series of complemental images are employed to produce color motion pictures and wherein the image supporting medium is intermittently advanced through the apparatus, it is essential that the intermittent transmission mechanism have considerable strength and rigidity so that the image supporting medium be positively and accurately advanced and so that the operation be free and smooth. However, these characteristics do not pertain to the ordinary type of Geneva movement comprising a pin wheel having pins on one side only and a Geneva wheel cooperating with the pins. On the contrary, in mechanism of this type the driving force of the pin applied to the Geneva wheel produces a torque about the radius of the pin wheel passing through the base of the driving pin, which tends to break off the pin, to produce binding between the pin and the Geneva slot due to flexing of the pin, to cause the pin to engage only the edges of the slot walls and therefore produce undue wear on the edges, resulting in lost motion, and to cause excessive friction between the pin wheel shaft and bearing due to the aforesaid objectionable torque.

Various means have been proposed to overcome the above mentioned difficulties but without a satisfactory degree of success. One proposed means comprises two pin wheels spaced apart with the pin or pins extending therebetween and mounted at their respective ends in the wheels, and a Geneva wheel arranged to engage the pin or pins between the two pin wheels. While this arrangement reduces the aforesaid objectionable torque it is unsatisfactory for multiplex motion picture apparatus and other apparatus chiefly for the following reasons: The portions of the Geneva wheel defined on one side by the pin slot and on the other side by the concave face cooperating with the mutilated ring on the pin wheel must be tapered to a very small thickness at and near their outermost edges, as is well-known, and these outer tapered portions are therefore comparatively weak, thus giving rise to undue flexing of these portions and to consequent lost motion and imperfect operation, and also giving rise to the liability of fracture of the tapered portions. These portions of the Geneva wheel might be increased in strength by increasing their thickness in the direction of the axis of the wheel were it not for the fact that, due to the inherent character of the apparatus, the pins on the pin wheels must be of relatively small diameter and, if given any substantial length to afford sufficient space between the two pin wheels for a relatively thick Geneva wheel, they would flex and therefore afford unsatisfactory operation.

The principal object of the present invention is to neutralize the aforesaid objectionable torque and at the same time provide a Geneva movement which is of such character that it can be made of sufficient thickness to have such strength and rigidity throughout all parts as to withstand all the aforesaid tendencies to flex or break.

Other objects attained by my invention, such as greater facility and accuracy in the manufacture of the apparatus, will be apparent from the subsequent description and accompanying drawings, in which—

Figure 1:
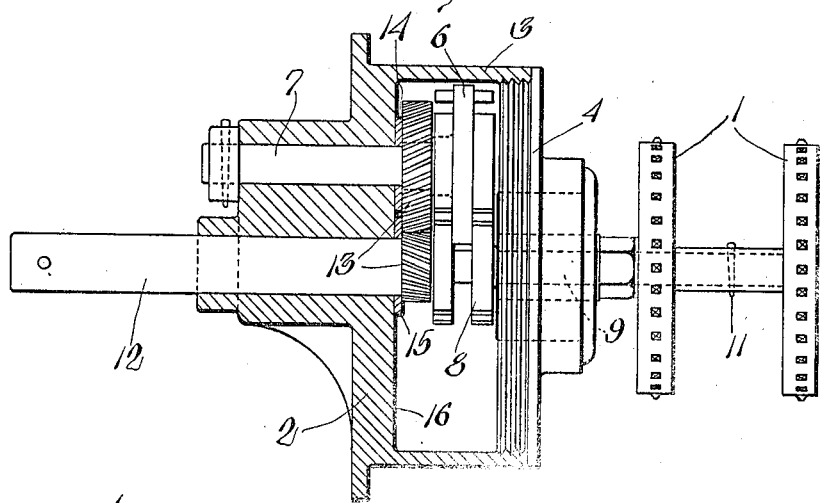
Figure 1 is a longitudinal section through the apparatus showing the parts in elevation.
Figure 3:
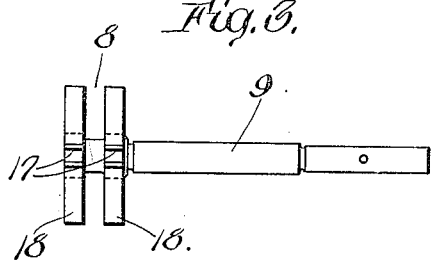
Figure 3 is a plan view of the Geneva wheel.
Figure 2:
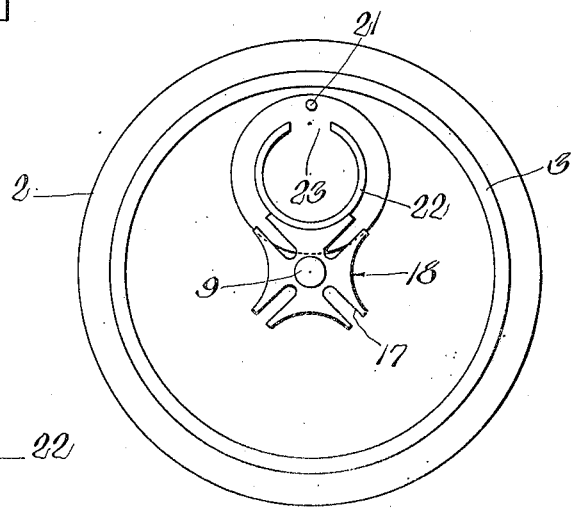
Figure 2 is a right end elevation of the apparatus shown in Fig. 1, with the cover removed.
Figure 4:
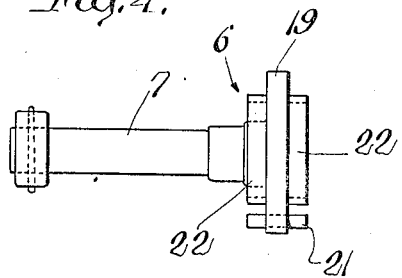
Figure 4 is a plan view of the pin wheel.

I have illustrated the invention in connection with a film feeding sprocket wheel 1 for motion picture apparatus, and the particular embodiment of the invention illustrated comprises a casing 2 having a flange 3 forming a housing for the Geneva movement and a cover 4 threaded into the flange 3. The pin wheel 6 is mounted on the idler shaft 7, which may be connected to any suitable source of power, and the Geneva wheel 8, consisting of two parts as more clearly illustrated in Fig. 3, is mounted on the driven shaft 9, which extends through the center of the cover 4 and is connected to the sprocket wheel 1 by means of a pin 11 or other suitable means. The idler shaft 7 carrying the pin wheel 6 may, for example, be driven by means of a power shaft 12 connected to the idler shaft 7 by means of a pair of bevel spur gears 13 of suitable speed ratio, bearing plates 14 and 15 preferably being positioned between the gear wheels and the inner face 16 of the housing 2.

As shown in Fig. 3, the Geneva movement comprises a pair of Geneva wheels spaced apart a distance sufficient to receive the pin wheel 6 therebetween. These wheels may be keyed to the shaft 9 or they may be formed integrally therewith, but in either event, the connection between the wheels and shaft is preferably made rigid before the slots 17 and concave faces 18 are formed in the wheels, so that these portions of the wheels may be in precise alignment properly to cooperate with the pin and mutilated rings of the pin wheel.

The pin wheel comprises a central disc portion 19 rigidly mounted on the shaft 7, and upon the disc portion 19 is mounted a pin 21 in suitable position to register with the slots of the Geneva wheels, the pin extending through the disc and extending outwardly from the opposite sides of the disc so as to engage each of the pair of Geneva wheels. While separate pins may be inserted from opposite sides of the discs, a single pin is preferably employed to extend through the disc inasmuch as the two ends of the continuous pin engaging the respective Geneva wheels are in accurate alignment. On opposite sides of the disc 19 are disposed rings 22 having portions cut away as indicated at 23, thus forming mutilated rings of a well known type. These rings may either be brazed to the disc 19 or they may be formed integrally therewith, the latter method of attachment being preferred.

The shafts carrying the pin wheel and Geneva wheels, respectively, are so spaced apart that the concave portions 18 of the Geneva wheels snugly fit against the mutilated rings 22 when the rings are presented to these surfaces, and so that the pin 21 engages slots 17 of the Geneva wheels when the pin wheel is rotated into the proper position. As the pin engages the slots, the Geneva wheels are disengaged from the mutilated rings and are permitted to be rotated one quarter revolution as the pin on the pin wheel is carried past the Geneva wheels, after which the succeeding concave surfaces 18 of the Geneva wheels again engage the mutilated rings and thus maintain the Geneva wheels accurately in position until the pin on the pin wheel is again brought into operative relation with the Geneva wheels.

Owing to the fact that the Geneva wheel is divided into two portions, the two portions being respectively disposed on opposite sides of the pin wheel, and owing to the fact that the pin extends through the pin wheel and projects outwardly on opposite sides thereof, the operative surfaces of the Geneva wheel can be made sufficiently extensive, measured along the axis of the wheel, to afford such strength and rigidity of the tapered portions of the wheels as to withstand all tendency to flex or break these portions. Furthermore, owing to the fact that the pin extends from opposite sides of the pin wheel, the torque produced by engagement with the Geneva wheels is balanced, thus compensating the twisting tendency which has been found to produce extensive stress and friction in prior apparatuses.

By virtue of the unique arrangement of the driving shaft, spur gears, and idler shaft, all of the transmission mechanism may be compactly housed in a small casing, and the continuously rotating driving shaft and the intermittently rotating driven shaft may be mounted in alignment, thus maintaining a straight line of shafting. This arrangement also contributes to the advantages derived from the circular type of casing, inasmuch as both the driving and driven shafts enter the casing axially, whereby the shaft bearings may be aligned with each other and with the threaded connection between the two parts of the housing with greater facility and accuracy. Furthermore, in threading the two parts of the housing together, either part of the housing may be rotated owing to the axial alignment of the shafts and housing.

While the invention has been described with reference to motion picture apparatus, it is obvious that it may be used with advantage in other apparatus. And while I have described apparatus employing only a single pin on the pin wheel, it is obvious that two or more pins uniformly spaced about the periphery of the pin wheel may, if desired, be employed.

I claim:

1. Intermittent transmission apparatus comprising a pin wheel having a pin portions of which extend outwardly from opposite sides thereof, and star wheels on opposite sides of the pin wheel in cooperative relationship with said pin.

2. Intermittent transmission apparatus comprising a pin wheel having a pin extending therethrough and extending outwardly from opposite sides thereof, and star wheels on opposite sides of the pin wheel in cooperative relationship with the opposite ends of the pin.

3. Intermittent transmission apparatus comprising a driving shaft, a pin wheel rigidly mounted on the driving shaft, a pin extending through the pin wheel and extending outwardly from the pin wheel on opposite sides, a driven shaft, and spaced Geneva wheels rigidly disposed on the driven shaft with their pin engaging slots in alinement, the two shafts being rotatably mounted in parallelism with the Geneva wheels in cooperative relationship with the opposite ends of said pin.

4. Intermittent transmission apparatus comprising a driving shaft, a pin wheel rigidly mounted on the driving shaft, a pin extending through the pin wheel and extending outwardly from the pin wheel on opposite sides, a driven shaft, and spaced Geneva wheels forming an integral part of the driven shaft and having their pin engaging slots in alinement, the two shafts being rigidly mounted in parallelism with the Geneva wheels in cooperative relationship with the opposite ends of said pin.

Signed by me at Boston, Massachusetts, this twenty-fifth day of November, 1916.

WILLIAM B. WESCOTT.